US011288392B2

(12) United States Patent
Watson et al.

(10) Patent No.: US 11,288,392 B2
(45) Date of Patent: *Mar. 29, 2022

(54) SYSTEMS AND METHODS FOR DATA PROTECTION

(71) Applicant: Capital One Services, LLC, McLean, VA (US)

(72) Inventors: Mark Watson, Sedona, AZ (US); Anh Truong, Champaign, IL (US); Vincent Pham, Champaign, IL (US); Reza Farivar, Champaign, IL (US); Fardin Abdi Taghi Abad, Seattle, WA (US); Jeremy Goodsitt, Champaign, IL (US); Austin Walters, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/003,320

(22) Filed: Aug. 26, 2020

(65) Prior Publication Data

US 2021/0216658 A1    Jul. 15, 2021

Related U.S. Application Data

(63) Continuation of application No. 16/738,041, filed on Jan. 9, 2020, now Pat. No. 10,789,383.

(51) Int. Cl.
*G06F 21/62* (2013.01)
*G06F 21/60* (2013.01)

(52) U.S. Cl.
CPC ........ *G06F 21/6218* (2013.01); *G06F 21/604* (2013.01); *G06F 21/6227* (2013.01); *G06F 21/6245* (2013.01); *G06F 2221/2141* (2013.01)

(58) Field of Classification Search
CPC .................................................. G06F 21/6218
See application file for complete search history.

(56) References Cited

U.S. PATENT DOCUMENTS 6,510,513 B1    1/2003  Danieli
6,820,082 B1   11/2004  Cook et al.
(Continued)

FOREIGN PATENT DOCUMENTS

EP        2169587 A1    3/2010
WO       01/33759 A1    5/2001
WO    2018057719 A1    3/2018

OTHER PUBLICATIONS

Notification Concerning Transmittal of International Preliminary Report on Patentability from related PCT Application No. PCT/US2020/067142 dated Apr. 19, 2021.

*Primary Examiner* — Bradley W Holder
(74) *Attorney, Agent, or Firm* — Hunton Andrews Kurth LLP

(57) ABSTRACT

A system includes a data owner interface, a database, a requester interface, an approver interface, a database interface, and a central controller. The data owner interface can provide protected data and data usage rules. The database can store the protected data. The requester interface can provide a request to access the protected data and receive sanitized results. The approver interface can provide approval or disapproval of access to the protected data and receive the data usage rules. The database interface can store the protected data in the database and provide access to the protected data.

20 Claims, 9 Drawing Sheets

(56) References Cited

U.S. PATENT DOCUMENTS

| | | | |
|---|---|---|---|
| 7,016,919 B2 | 3/2006 | Cotton et al. | |
| 7,089,581 B1 | 8/2006 | Nagai et al. | |
| 7,246,137 B2 | 7/2007 | Paulus et al. | |
| 7,299,504 B1 | 11/2007 | Tiller et al. | |
| 7,509,468 B1 | 3/2009 | Dalal et al. | |
| 7,624,425 B1 | 11/2009 | Graves | |
| 7,716,716 B1 | 5/2010 | Boystun | |
| 8,112,661 B1 | 2/2012 | La France et al. | |
| 8,290,979 B1 | 10/2012 | Fernandez | |
| 8,316,051 B1 | 11/2012 | Burns et al. | |
| 9,218,502 B1 * | 12/2015 | Doermann | G06F 21/604 |
| 9,430,652 B1 | 8/2016 | Mattsson et al. | |
| 9,489,354 B1 | 11/2016 | Lee et al. | |
| 9,577,986 B1 | 2/2017 | Dooley | |
| 9,749,193 B1 * | 8/2017 | Rokicki | H04L 63/0428 |
| 2002/0161766 A1 | 10/2002 | Lawson et al. | |
| 2003/0037263 A1 * | 2/2003 | Kamat | G06F 21/604 726/14 |
| 2004/0122823 A1 | 6/2004 | Baffes et al. | |
| 2005/0236474 A1 | 10/2005 | Onuma et al. | |
| 2005/0278334 A1 | 12/2005 | Fey et al. | |
| 2007/0038765 A1 | 2/2007 | Dunn | |
| 2007/0192162 A1 | 8/2007 | Simons et al. | |
| 2007/0226298 A1 | 9/2007 | Klein | |
| 2009/0182780 A1 | 7/2009 | Wong et al. | |
| 2009/0292743 A1 | 11/2009 | Bigus et al. | |
| 2010/0088551 A1 | 4/2010 | Berkner et al. | |
| 2010/0251377 A1 | 9/2010 | Shulman et al. | |
| 2011/0208663 A1 | 8/2011 | Kennis et al. | |
| 2012/0310905 A1 | 12/2012 | Hans et al. | |
| 2013/0081101 A1 * | 3/2013 | Baer | H04L 63/20 726/1 |
| 2014/0289359 A1 | 9/2014 | Whitton et al. | |
| 2015/0113075 A1 | 4/2015 | Vanderwiel | |
| 2015/0172307 A1 | 6/2015 | Borohovski et al. | |
| 2015/0193638 A1 | 7/2015 | Cook | |
| 2017/0346847 A1 | 11/2017 | Borohovski et al. | |
| 2018/0018738 A1 | 1/2018 | Bernauer et al. | |

* cited by examiner

SYSTEMS AND METHODS FOR DATA PROTECTION

CROSS REFERENCE TO RELATED APPLICATION

This application is a continuation of U.S. patent application Ser. No. 16/738,041 filed Jan. 9, 2020, the complete disclosure of which is incorporated herein by reference in its entirety.

FIELD OF THE INVENTION

The present disclosure generally relates to computer systems and, in particular, to systems and methods for data protection.

BACKGROUND

Recent widely publicized data breaches have exposed the personal information of hundreds of millions of people. Some reports point to alarming increases in both the size and frequency of data breaches.

Businesses face increasing risks under data privacy laws and regulations. The California Consumer Protection Act (CCPA) and The European Union (EU) General Data Protection Regulation (GDPR) introduced new data protection obligations for businesses while providing increased data protection rights for data subjects. The GDPR significantly increases fines for non-compliance.

There is more widespread adoption of artificial intelligence as the technology becomes embedded in more and more industry applications. While artificial intelligence applications can boost productivity, and alleviate repetitive, menial tasks, there are concerns about how best to address data protection issues that arise. Applications in industries such as health care and financial technology can sometimes involve processing protected data such as patient health information and credit card account information. Artificial intelligence applications such as machine learning can sometimes involve training models using voluminous amounts of data that may include protected private data or commercially sensitive proprietary data.

There are many big data analytics applications where research and development are slowed because the people doing the research and development do not have rights to the big data sets they need. For example, researchers may not work for the hospitals, universities, or scientific research institutions that own the data needed to investigate cures for diseases or the feasibility of new drugs. For example, companies must make risky business decisions with incomplete information because they do not have access to some proprietary information collected by their competitors, preventing improved market efficiency, advanced business models, and enhanced customer experiences.

Accordingly, there are significant, and competing, needs for computer systems and methods that efficiently manage data protection risks and include data protection compliance and mitigation solutions.

SUMMARY

The disclosed subject matter is directed to systems and methods for data protection that satisfy these needs.

An example embodiment of the present disclosure can be a system comprising a data owner interface, a database, a requester interface, an approver interface, a database interface, and a central controller. The data owner interface can provide protected data and data usage rules. The database can store the protected data. The requester interface can provide a request to access the protected data and receive sanitized results. The approver interface can provide approval or disapproval of access to the protected data and receive the data usage rules. The database interface can store the protected data in the database and provide access to the protected data. The central controller can be configured to perform a method. The central controller can receive the protected data and the data usage rules from the data owner interface. The central controller can store the protected data in the database using the database interface. The central controller can send the data usage rules to the approver interface. The central controller can receive the request to access the protected data from the requester interface. The central controller can send the request to access the protected data to the approver interface. The central controller can receive an approval or a disapproval for the request to access the protected data from the approver interface. The central controller can access the protected data using the database interface, if the approval was received from the approver interface. The central controller can receive results from the database interface, if the approval was received from the approver interface. The central controller can send a request to access the results to the approver interface. The central controller can receive an approval or a disapproval for the request to access the results from the approver interface. The central controller can generate sanitized results, if the disapproval was received from the approver interface. The central controller can make the results the sanitized results, if the approval was received from the approver interface. The central controller can provide the sanitized results to the requester interface. The data usage rules may be data privacy rules, business rules, or export rules. The data owner interface can receive a privacy record and the central controller can be further configured to provide the privacy record to the data owner interface. The central controller can be further configured to modify the request to access the protected data from the requester interface, according to the data usage rules, and send the modified request to access the protected data to the approver interface and to the database interface. The data usage rules can translate a first data format used by the data owner interface into a second data format used by the database interface. The data usage rules can translate a third data format used by the requester interface into the second data format used by the database interface.

An example embodiment of the present disclosure can be a method performed by a data escrow system. The data escrow system can receive a request to access protected data. The data escrow system can receive an approval or a disapproval for the request to access the protected data. The data escrow system can access the protected data to generate a report, if the approval was received. The data escrow system can provide the report, if the approval was received. The data escrow system can be located in a jurisdiction where an owner of the protected data resides. The data escrow system can provide a record to the owner of the protected data. The data escrow system can receive approval or disapproval for digital artifacts produced while accessing the protected data. The data escrow system can provide the digital artifacts, if the approval was received. The data escrow system can store the protected data in a database. The database can be located in the jurisdiction where the owner of the protected data resides. The data escrow system can provide an interface for receiving the request to access the protected data and providing the report. The data escrow system can provide an interface for the approval or disapproval for access to the protected data. The data escrow system can provide an interface for the approval or disapproval of the digital artifacts. The data escrow system can provide a data catalog identifying the protected data. The data escrow system can provide a list of application programming interfaces (APIs) identifying the protected data. The data escrow system can provide cloud computing services.

An example embodiment of the present disclosure can be a non-transitory computer-accessible medium having stored thereon computer-executable instructions, wherein upon execution by a computer arrangement comprising a processor, the instructions cause the computer arrangement to perform procedures. Protected data can be stored in a database and the database can be located in a jurisdiction where an owner of the protected data resides. An interface can be provided for receiving a request to access the protected data and providing a report. An interface can be provided for an approval or a disapproval of the request for access to the protected data and for an approval or a disapproval of digital artifacts. A data catalog can be provided that identifies the protected data. A list of application programming interfaces can be provided that identify the protected data. A request to access the protected data can be received. An approval or the disapproval for the request to access the protected data can be received. The protected data can be accessed to generate a report, if the approval was received. The report can be provided, if the approval was received. A record can be provided to the owner of the protected data. The approval or the disapproval for the digital artifacts produced while accessing the protected data can be received. The digital artifacts can be provided, if the approval was received.

These and other features, aspects and advantages of the disclosed subject matter are explained in greater detail with reference to specific example embodiments that are illustrated in the following description, appended claims, and accompanying drawings, in which like elements are indicated with like reference designators.

DETAILED DESCRIPTION OF EXAMPLE EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Figure 1:
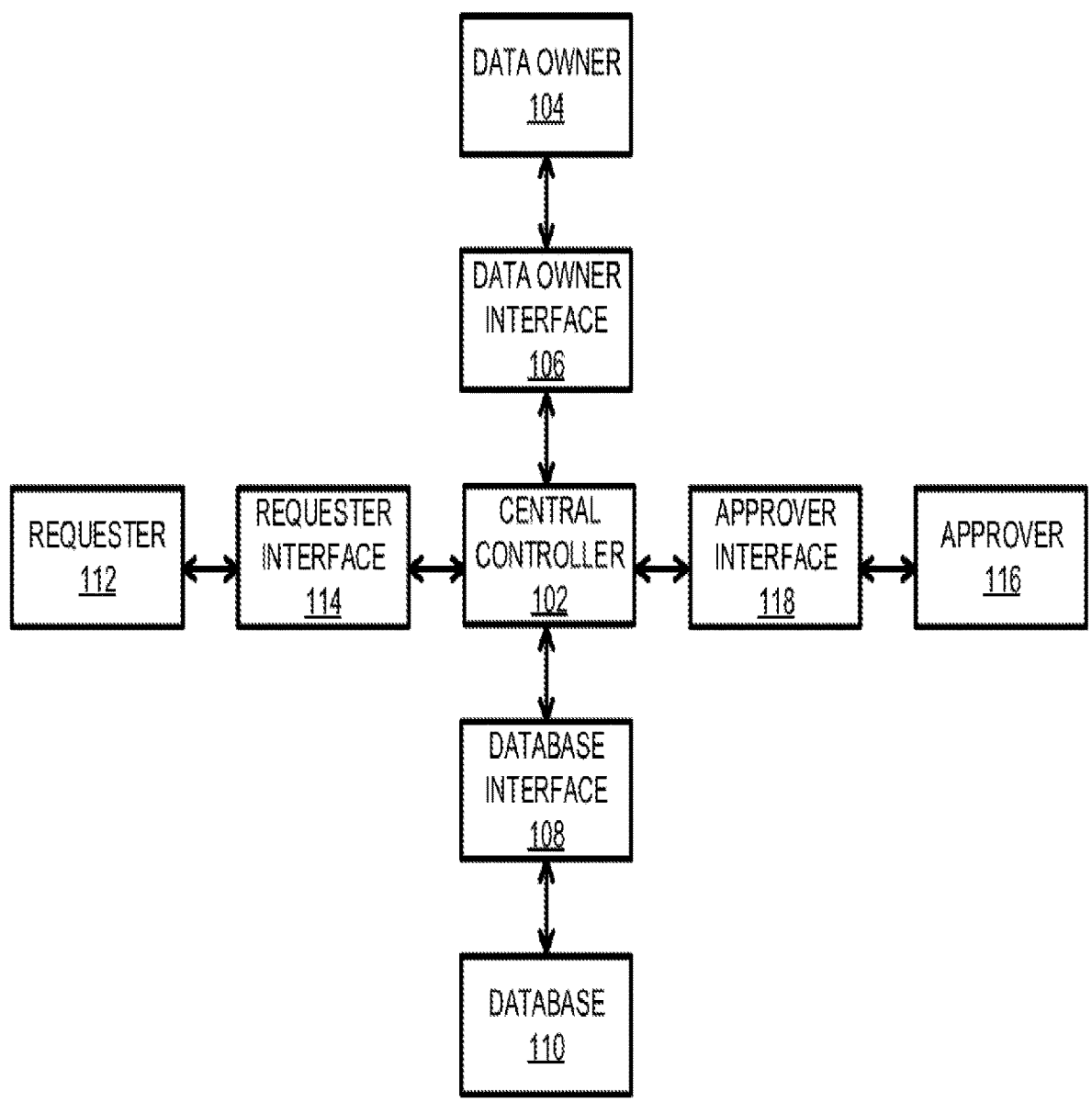
FIG. 1 is diagram of a system for data protection, according to an example embodiment of the disclosure.

FIG. 1 is diagram of a system 100 for data protection, according to an example embodiment of the disclosure. System 100 comprises a central controller 102, a data owner interface 106 for a data owner 104, a database interface 108 for a database 110, a requester interface 114 for a requester 112, and an approver interface 118 for an approver 116. Data owner interface 106 can provide protected data and data usage rules. Requester interface 114 can provide a request to access the protected data and receive sanitized results. Approver interface 118 can provide approval or disapproval of access to the protected data and receive the data usage rules. Database interface 108 can store the protected data in database 110 and provide access to the protected data stored in database 110.

Data owner 104 can, for example, provide data collected from various different sources such as internet of things (IoT) sensors, machines, devices, video, audio, networks, log files, transactions, web applications, analytics, search engines, cloud-based solutions, business management, and social media. The data can be large or small, similar or diverse data sets of structured, semi-structured, or unstructured data.

Requester 112 may, for example, desire to analyze data for various applications in various industries such as clickstream, point-of-sale, and segmentation analysis in retail, fraud detection in financial services, personalized user experience in gaming, and big data analytics in manufacturing, healthcare, and logistics.

Approver 116 may, for example, enforce data privacy rules and regulations, data export rules, business agreements about commercially sensitive proprietary data, and other rules desired from stakeholders, who are acting as data owner 104, requester 112, and approver 116. Other types of stakeholders in the protected data stored in database 110 can be used in system 100, and interfaces can be provided for each type of stakeholder.

Database 110 can be any organized collection of data that is stored and accessed electronically from a network-enabled computer. Database 110 can include a database management system (DBMS), which is software that processes data for users such as defining, creating, maintaining, administering, and controlling access to the database. Database 110 can be a relational database that models data as rows and columns in tables and uses structured query language (SQL) for writing and querying data. Database 110 can be standalone on the network or combined with central controller 102 or another network-enabled computer. Database 110 can include data catalogs describing data available, the format of the data, and whether the data is protected or not. Database 110 can include schemas for data sets and features of data sets. Database 110 can include information about which data sets, features of data sets, or types of records are protected.

Central controller 102, data owner 104, requester 112, approver 116, and database 110 can be network-enabled computers. As referred to herein, a network-enabled computer may include, but is not limited to a computer device, or communications device including, e.g., a server, a network appliance, a workstation, a personal computer, a phone, a handheld PC, a personal digital assistant, a thin client, a fat client, an Internet browser, a mobile device, or other device. For example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

In system 100, a network-enabled computer can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein.

In system 100, a network-enabled computer can include a display and input devices. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the user's device that is available and supported by the user's device, such as a touch-screen, keyboard, mouse, cursor-control device, touch-screen, microphone, digital camera, video recorder or camcorder. These devices can be used to enter information and interact with the software and other devices described herein. In some examples, the network-enabled computer can execute one or more applications, such as software applications, that enable, for example, network communications with one or more components of the system 100 and transmit and/or receive data.

In system 100, a network-enabled computer can be a client device in communication with one or more servers via one or more networks, and can operate as a respective front-end to back-end pair with the server. A client device can transmit, for example from a mobile device application executing on the client device, one or more requests to the server. The one or more requests can be associated with retrieving data from the server. The server can receive the one or more requests from the client device. Based on the one or more requests from the client device, the server can be configured to retrieve the requested data from one or more databases. Based on receipt of the requested data from the one or more databases, the server can be configured to transmit the received data to the client device. For example, the received data can be responsive to one or more requests.

In system 100, the network can be one or more of a wireless network, a wired network or any combination of wireless network and wired network, and can be configured to connect the client device to the server. For example, the network can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In system 100, the network can include, without limitation, telephone lines, fiber optics, IEEE Ethernet 902.3, a wide area network, a wireless personal area network, a LAN, or a global network such as the Internet. The network can support an Internet network, a wireless communication network, a cellular network, or the like, or any combination thereof. The network can further include one network, or any number of the exemplary types of networks mentioned above, operating as a stand-alone network or in cooperation with each other. The network can utilize one or more protocols of one or more network elements to which they are communicatively coupled. The network can translate to or from other protocols to one or more protocols of network devices. Although the network is depicted as a single network, it should be appreciated that according to one or more examples, the network can comprise any number of interconnected networks, such as, for example, the Internet, a service provider's network, a cable television network, corporate networks, such as credit card association networks, and home networks.

Figure 2:
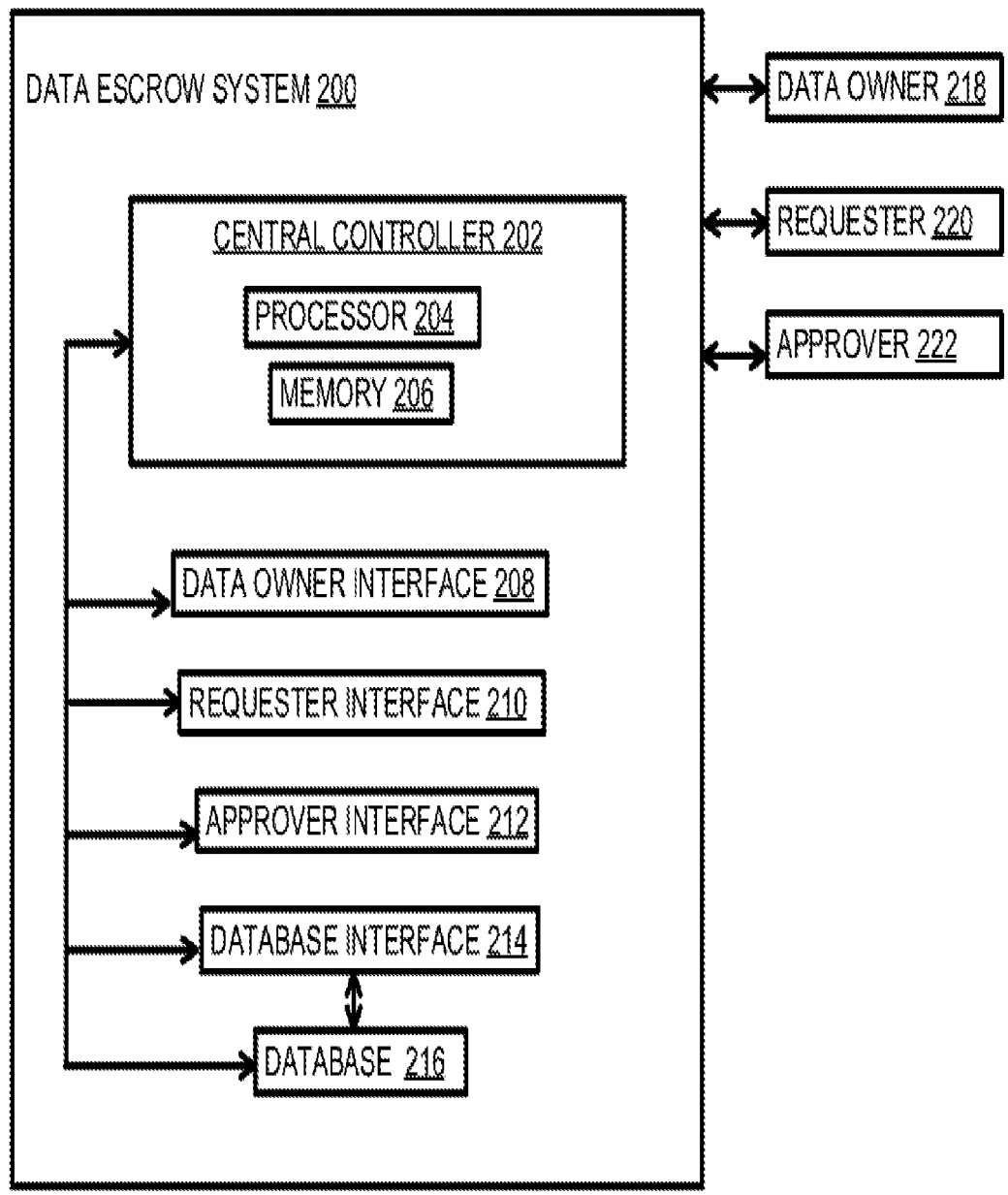
FIG. 2 is diagram of a data escrow system, according to an example embodiment of the disclosure.

FIG. 2 is diagram of a data escrow system 200, according to an example embodiment of the disclosure. Data escrow system 200 can be similar to an escrow account that a bank uses to hold money until a home sale is finalized at the closing. Data escrow system 200 can be used to protect data with a central controller 202 that ensures that certain conditions are met for the interactions between various parties such as a data owner 218, a requester 220, and an approver 222. For example, data owner 218 and requester 220 may be strategic partners that have certain interests in common. Each may have customer lists, trade secrets, and other highly confidential commercial information that they would never disclose to each other. Data escrow system 200 may allow one company to donate data and the other company to use it, under data protection conditions that further the best interest of both strategic partners and can be enforceable by approver 222.

Data escrow system 200 can provide cloud computing services. For example, data escrow system can include a cloud platform similar to Amazon Web Services (AWS)®, Google Cloud Storage (GCS)®, and Microsoft Azure®.

Central controller 202 can be a network-enabled computer that has a processor 204 and a memory 206. Central controller 202 can make interfaces available to parties outside of data escrow system 200 by, for example, making them available on a website, providing them upon request, or according to a messaging protocol. Data owner 218 can interact with data escrow system 200 via data owner interface 208, requester 220 can interact with data escrow system 200 via requester interface 210, and approver 222 can interact with data escrow system 200 via approver interface 212. Central controller 202 can interact with database 216 using database interface 214 or directly interact with database 216. Central controller 202 can include instructions in memory 206 that are executable by processor 204 for data protection. The instructions can include a method of data protection as shown in FIG. 3.

Figure 3:
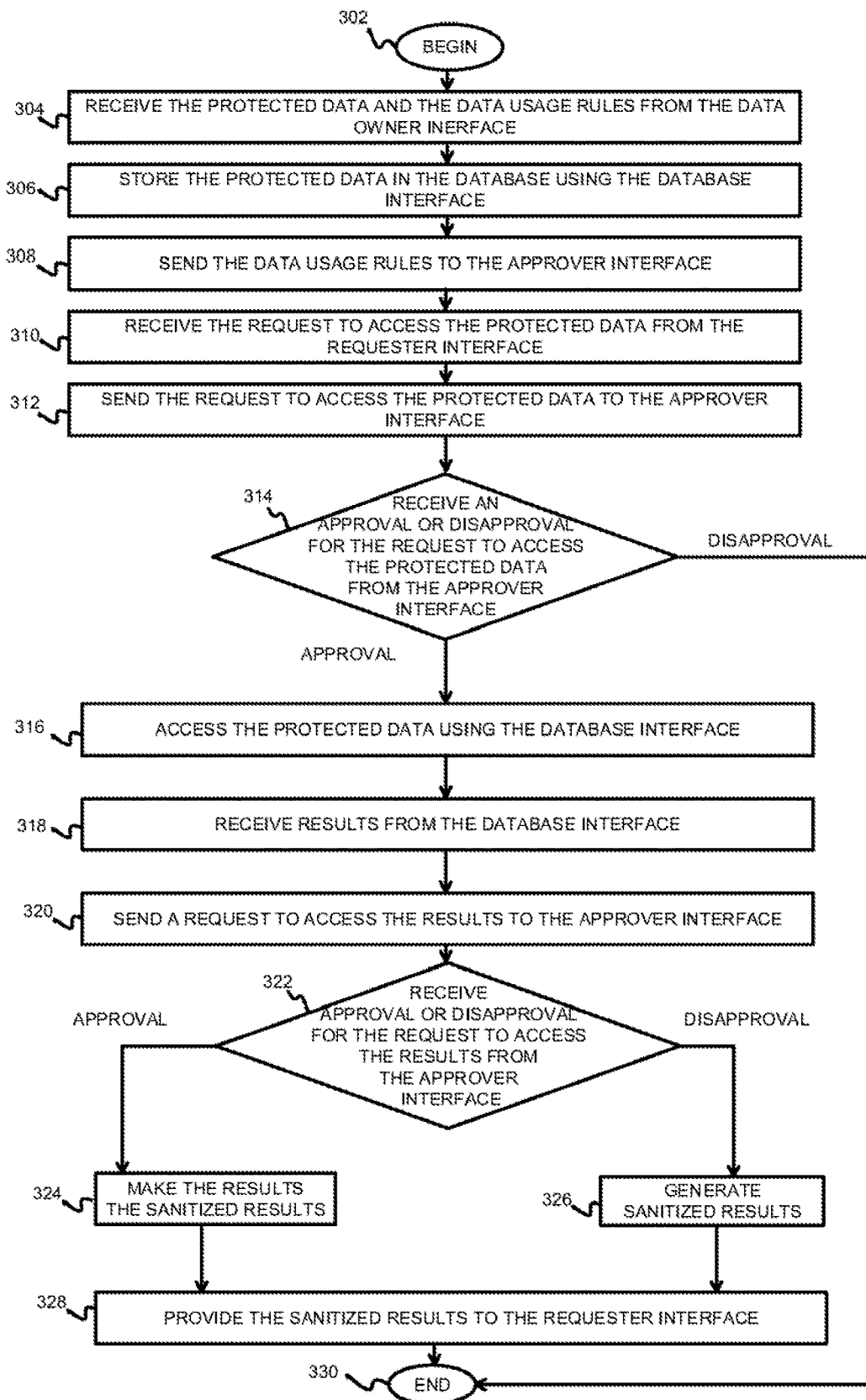
FIG. 3 is a flow chart for a method for data protection, according to an example embodiment of the disclosure.

FIG. 3 is a flow chart for a method 300 for data protection, according to an example embodiment of the disclosure. Method 300 begins at block 302. At block 304, the central controller can receive the protected data and the data usage rules from the data owner interface. The data usage rules may be, for example, data privacy rules, business rules, export rules, or any other kind of rules for protecting data received from the data owner interface. Additional data usage rules to protect data may be applied by the central controller, the database, interfaces and/or the approver. The central controller can be a neutral and trusted third party that manages the risks and balances the interests of different stakeholders such as data owners, requesters, and approvers.

At block 306, the central controller can store the protected data in the database using the database interface. The data can be filtered and reformatted in order to protect the data and various filters and formats can be stored by the central controller in memory or by the database interface or database and can be shared in part or in whole with the approver or other stakeholders.

At block 308, the central controller can send the data usage rules to the approver interface. The central controller may be configured to enforce the data usage rules and/or provide ways to do so via the approver interface. The approver can use the approver interface and/or additional methods to enforce the data usage rules from the data owner or to do any other needed approval tasks such as enforcing rules to protect data.

At block 310, the central controller can receive the request to access the protected data from the requester interface. For example, the requester can submit a database query that would access some protected data and some unprotected data. The central controller can process or modify the request according to the data usage rules to determine what needs approval.

At block 312, the central controller can send the request on behalf of the requester to access the protected data to the approver interface. The approver can process the request according to the data usage rules to determine whether to approve the request or not.

At block 314, the central controller can receive an approval or a disapproval for the request to access the protected data from the approver interface. The approver can provide a partial approval and a partial disapproval and the central controller can notify the requester of the partial disapproval and proceed with a modified request for the part that was approved. The central controller can provide information to the requester and give the requester an opportunity to revise the request. If the central controller receives a disapproval, then method 300 ends at block 330. The central controller can notify the requester of the disapproval using the requester interface. If the central controller receives the approval, then at block 316, the central controller can access the protected data on behalf of the requester using the database interface. At block 318, the central controller can receive results from the database interface. The central controller and/or database may process the results by using filters or additional logic based on the usage rules.

At block 320, the central controller can send a request on behalf of the requester to access the results to the approver interface. At block 322, the central controller can receive an approval or a disapproval for the request on behalf of the requester to access the results from the approver interface.

If the approval was received from the approver interface, then at block 324 the central controller can make the results the sanitized results. In other words, the results are already sanitized or no sanitizing needs to be done. If the central controller receives the disapproval, then at block 326 the central controller can generate sanitized results. A partial approval and partial disapproval can also be processed by the central controller so that some results are provided and other results are sanitized before being provided. Sanitized results can be generated by, for example, using the data usage rules from the data owner and eliminating any protected data from the results. Sanitized results can be generated by, for example, using filters associated with the database interface to protect information about the data stored in the database such as its format and contents. At block 328, the central controller can provide the sanitized results to the requester interface. Method 300 ends at block 330.

In method 300, the data owner interface can receive a privacy record and the central controller can be further configured to provide the privacy record to the data owner interface. The central controller can be further configured to modify the request to access the protected data from the requester interface, according to the data usage rules, and send the modified request to access the protected data to the approver interface and to the database interface. The data usage rules can translate a first data format used by the data owner interface into a second data format used by the database interface. The data usage rules can translate a third data format used by the requester interface into the second data format used by the database interface. In this way, the format or structure of the data can be protected. For example, the data owner may desire to protect certain database schemas and APIs associated with some data that was provided to central controller for business or other reasons and the data usage rules can be used to reorganize and translate the data in a way to protect this interest. For example, the requester may desire to access data for a single purpose such as determining credit worthiness of a customer located in a foreign country that is consistent with the data usage rules and interests of other stakeholders and the central controller can provide a requester interface that allows this access for this single purpose but forbids other purposes, according to the data usage rules.

For example, method 300 may be applied in an application development scenario where the requester is an application developer. The central controller can provide APIs for interacting with requesters, who desire to run artificial intelligence programs on protected data stored in the database such as the application developer who desires to run a machine learning model for detecting credit card fraud on credit card account data. The central controller can provide APIs for interacting with an approver on behalf of the requester to comply with data usage rules such as privacy rules, financial rules, and other laws and regulations. Database interfaces or APIs can be provided to the central controller, requester, and/or approver that provide information about which data sets, features, or records in the database are protected and what the data usage rules are in particular contexts or scenarios. For example, data owners can be financial entities, who are potential competitors that agree to share credit card data for the purposes of detecting fraud to help the industry as a whole subject to certain conditions such as antitrust, competition and other interests. The central controller can access credit card account data in the database and make it available for the developer's fraud detection application, according to approval of data usage rules. The central controller, database, or database interface can include systems and methods for accessing protected data, application development tools, workflow management, and information related to processing the requesters' requests. The central controller can include a logging function that tracks when and how protected data is used. The central controller can include a temporary storage area for results such as an analysis of potential fraud in credit card accounts in spreadsheets and a trained machine learning model. Results can include debugging information, execution errors and information related to the protected data. The central controller or regulator can provide sanitized results that help the developer debug or modify the machine learning model for another run without revealing protected data or violating other data usage rules.

In method 300, the central controller can sanitize the results through data sanitization APIs provided by another network-enabled computer such as a regulator's computer in data communication with the central controller. Data sanitization can include deliberately, permanently and irreversibly removing or destroying the data stored on a memory device to make it unrecoverable. A device that has been sanitized can have no usable residual data so that, even with the assistance of advanced forensic tools, the data will not ever be recovered. Some data sanitization methods include physical destruction, cryptographic erasure or data erasure. Other data sanitization methods include data deletion, reformatting, factory reset, data wiping, file shredding, data clearing, data purging, and data destruction. The central controller or regulator can create proof of data sanitization and other reports or records suitable for audit by data privacy regulators. For example, the central controller or regulator can generate a certificate of erasure of personal data that is tamper-proof and digitally signed. For example, the central controller or regulator can generate a protected data life cycle record or certified erasure report.

Figure 4:
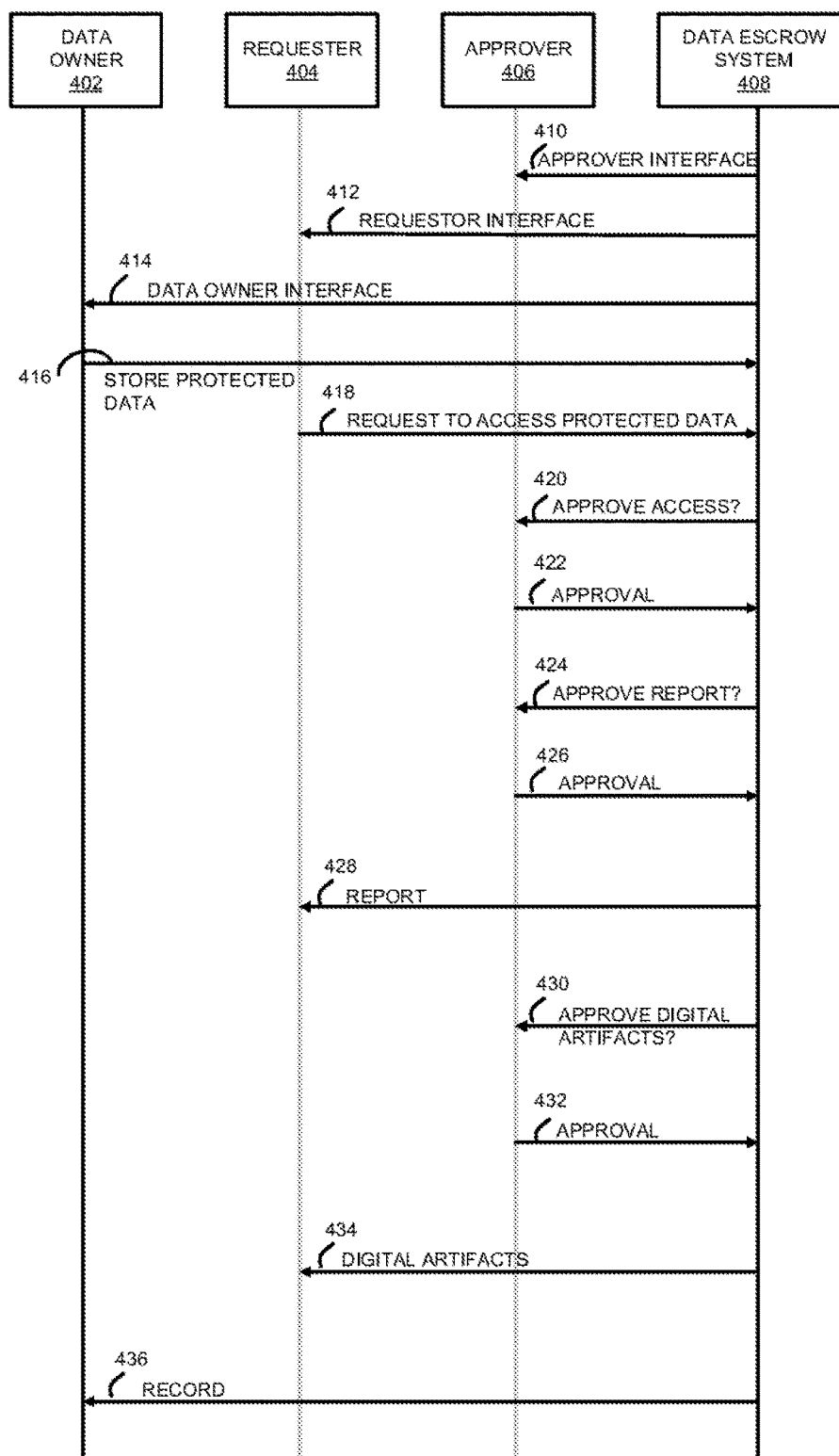
FIG. 4 is a sequence diagram of a method for data protection, according to an example embodiment of the disclosure.

FIG. 4 is a sequence diagram of a method 400 for data protection, according to an example embodiment of the disclosure. Method 400 can be a sequence of messages via a communication protocol between a data owner 402, a requester 404, an approver 406, and a data escrow system 408. Method 400 can be implemented through user interfaces, APIs, and/or other resources available on a network that can define interactions between data owner 402, requester 404, approver 406, and data escrow system 408.

For example, data escrow system 408 can use method 400 to facilitate application development while protecting data. Data escrow system 408 can include a collection of procedures and tools for developing, testing and debugging applications as well as data protection controls. In this application development scenario, requester 404 can be a developer working on an application that includes a proprietary method of calculating a credit rating. Requester 404 can run the application on protected data that is stored in data escrow system 408 from data owner 402. Requester can provide rules to data escrow system 408 about not disclosing the proprietary method of calculating the credit rating to data owner 402. Data owner 402 can provide financial data from a foreign country that is subject to data export prohibitions and data privacy laws to data escrow system 408. Data owner 402 may also provide rules to data escrow system 408 about not violating the data export and data privacy rules in interactions with requester 404 and providing compliance records. Data escrow system 408 and approver 406 can use method 400 to help enforce the rules to protect the interests of both the requester and the data owner.

In method 400, data escrow system 408 can provide an approver interface 410 to approver 406, a requester interface 412 to requester 404, and a data owner interface 414 to data owner 402. Data owner interface 414 can define how to provide protected data so that data escrow system 408 can store it in a database. The database and data escrow system 408 can be located in the jurisdiction where data owner 402 resides. Requester interface 412 can define how to request to access the protected data 418 and receive the report 428 and digital artifacts 434 from data escrow system 408. Approver interface 410 can define how to approve access 420 to the protected data, approve reports 424, and approve digital artifacts 430. Data escrow system 408 can provide additional information in various interfaces such as a data catalog identifying the protected data and a list of application programming interfaces identifying the protected data.

Data owner 402 can provide protected data for storage 416 in data escrow system 408. Requester 404 can request access to the protected data 418 from data escrow system 408. In response, data escrow system 408 can ask approver 406 to approve access 420 on behalf of requester 404 receive approval 422, access the protected data to produce a report, ask approver 406 to approve the report 424 for release to requester 404, receive approval 426, and provide the report 428 to requester 404. If any digital artifacts were produced during access of the protected data, data escrow system 408 can ask approver 406 to approve the digital artifacts 430 for release to requester 404, receive approval 432, and provide the digital artifacts 434 to requester 404. Periodically or upon request, data escrow system 408 can provide a record 436 to data owner 402, such as a compliance record about access to the protected data.

For example, data escrow system 408 can receive a request to access protected data 418 from a requester, who is a developer working on an artificial intelligence program that builds a learning model to analyze x-rays. The request can be for accessing protected patient x-ray records to produce results, errors and/or debugging information. Depending on rules and approvals, the program may be run and the results may be sanitized by removing or cleansing any protected data from the results, errors and/or debugging information. If approver 406 disapproves access, reports, or digital artifacts at any point, data escrow system 408 can provide feedback to requester 404 about any rules about the protected data so that requester 404 can modify the request and try again. For example, before requesting access to run the program that builds a learning model to analyze x-rays, the requester 404 can use requester interface 412 to determine how to access to certain kinds of protected patient x-ray records or other healthcare or medical information. If disapproval is received, then the requester 404 can make a different or modified request to access protected data 418. Once approval 422 is received by data escrow system 408 from approver 406, then the data escrow system 408 can run the program on the protected data on behalf of the requester 404. As a result of running the program on the protected data, a report can be created by data escrow system 408 about the results. Data escrow system 408 can request approval 426 of the report from approver 406, receive approval 426 in response, and then provide the report 428 to requester 404. In addition to the report, digital artifacts may have been created while the program ran on the protected data. Data escrow system 408 can send a request to approve the digital artifacts 430 to approver 406, receive approval 432 in response, and then send the approved digital artifacts to requester 404. For example, the model may create charts or spreadsheets containing x-ray analysis as digital artifacts. The approver may take a look at the digital artifacts and see if they contain any patient information that needs to be protected such as a patient's name and date of birth. Data escrow system 408 can send a record 436 to data owner 402 about how and what data was accessed by running the x-ray analysis model on the protected data that can be used for compliance by a health care organization.

Figure 5:
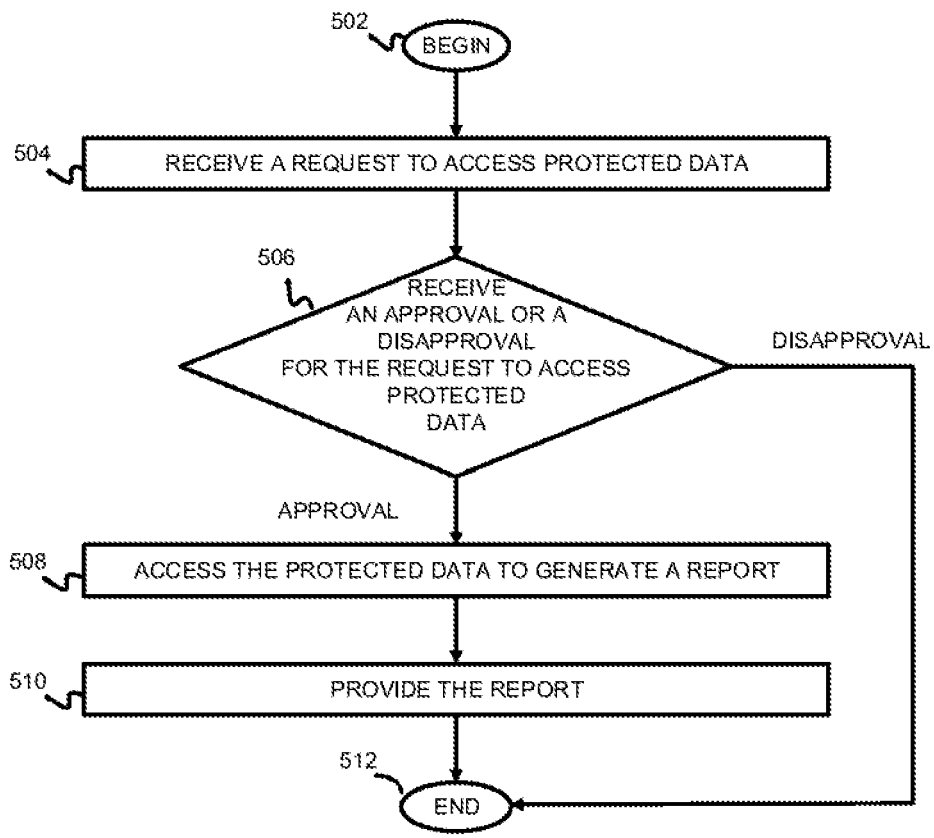
FIG. 5 is a flow chart for a method for data protection, according to an example embodiment of the disclosure.

FIG. 5 is a flow chart for a method 500 for data protection, according to an example embodiment of the disclosure. Method 500 begins at block 502. Method 500 can be performed by a data escrow system having a central controller.

At block 504, the data escrow system can receive a request to access protected data. For example, the central controller can receive the request from a requester using a requester interface or the central controller can receive a message via a communication link according to a protocol for communication between the requester and the central controller.

At block 506, the data escrow system can receive an approval or a disapproval for the request to access protected data. If the data escrow system receives the disapproval for the request to access the protected data, the method 500 ends at block 512. If the data escrow system receives the approval, then at block 508, the data escrow system can access the protected data to generate a report and provide the report at block 510. Method 500 ends at block 512. For example, the central controller can use an approver interface to request approval from an approver on behalf of the requester and receive either approval or disapproval from the approver using the approver interface. The central controller can send a message requesting approval on behalf of the requester via a communication link to the approver and receive a message in response that indicates either approval or disapproval from the approver.

The central controller can use method 500 in various data privacy scenarios and provide interfaces for interactions between the central controller and data owners, requesters, and approvers. For example, the requester can be a data owner, who requests access to personal data, requests modification of their data, requests deletion of their data, requests that all processing of their personal data be stopped, requests notification about the use of their personal data, requests that their personal data be sent to a third party, or the data owner may make some other request. The approver can be a data privacy regulator. The central controller can be a neutral third party that processes requests and reports by interacting with the data owner, database, and the data privacy regulator using the interfaces and/or using a messaging protocol via a data communication link.

For example, the central controller can use method 500 to receive protected data from a data owner who consents to data being collected by a business. The central controller can receive some collected data along with a proof of consent from the data owner. The approver and central controller can interact using the approval interface to share data usage rules about data privacy concerning the data owner and the business. The central controller can request that the data privacy regulator approve the collected data and proof of consent, before storing the collected data in a database. The data privacy regulator can verify the proof of consent of the data owner. The central controller can receive, create, store, or modify filters or database interfaces to protect the collected data being stored in the database, according to data usage rules. After storing the collected data, the central controller can receive a request to access the protected data and send a request to the approver on behalf of the requester. The request can be modified according to data usage rules. The central controller can provide a privacy record using the data owner interface. The central controller can interact with the approver to receive the privacy record and forward the privacy record to the data owner. The central controller, approver, and/or database can generate and maintain records suitable for audits and complying with data privacy regulations.

For example, method 500 can be used for a data escrow service that runs applications on protected data. The data escrow service can be provided by a third party escrow company. The third party escrow company can run proprietary artificial intelligence applications owned by company A with data controlled by company B. The third party escrow company can provide a public encryption key to both company A and company B. Developers at company A can encrypt a file of a compiled application with the public key and transfer this encrypted file to the third party escrow company. Data owners at company B can encrypt protected data with the public key and transfer this encrypted protected data to the third party escrow company. The third party escrow company can decrypt the application and protected data and run the application on the protected data in a secure application development environment. The results from running the application on the protected data in the secure development environment can be approved by a data privacy regulator and exported from the secure application development environment to developers at company A and/or data owners at company B.

For example, the data escrow service can use method 500 to receive an encrypted artificial intelligence model training and analysis application from a developer and decrypt the application. The developer can flag the protected data that the application will use in an API. The protected data can be stored in a database in the secure application development environment. The data escrow service can run the application on the protected data to generate a report. For example, if an application for detecting credit card fraud ran successfully on credit card account data, then the report can include fraud analysis information. If the application run had errors, then the report may include runtime errors and debugging information. The report can be encrypted before exporting it outside of the secure development environment. The data escrow service can encrypt the report and provide the encrypted report to the developer through an API.

For example, method 500 can be used by a data escrow service to run a medical research application on patient medical data and produce a report. The report can include any output from the application such as tables of data about dosages of drugs administered to patients. The data escrow service can provide a record to the owner of the protected data through an API for data owners. For example, the record can include information about how, when, or why the data owner's data was used by the medical research application. The record can include the purpose of use or category of use such as the purpose of medical research for a new drug. The record can refer to a data flow map created for compliance with data privacy rules that documents the processing of personal data from collection through disposal. The data escrow service can receive approval or disapproval for digital artifacts produced while running the application. For example, if when the medical research application ran on patient medical data, a predictive model was trained, then files for the trained model would be digital artifacts that can be stored in a directory in the secure developer environment. The data escrow service can receive approval or disapproval from an API for healthcare organizations or data privacy regulators.

For example, a data escrow service can use method 500 to facilitate climate change research and collect data from sources such as weather reports, geological sensor data, space exploration data, academic research, and government research. Researchers can request access to protected data with appropriate approvals and provide useful reports while protecting the interests of various stakeholders such as news organizations, scientists, government entities, research entities, and nonprofit entities.

For example, a data escrow service can use method 500 in an industrial manufacturing context where various industrial machines, robots, sensors, and processing plants collect voluminous data that can be used as feedback to improve the field of industrial manufacturing generally and even share information among competitors, universities, or governments while protecting the interests of stakeholders.

Figure 6:
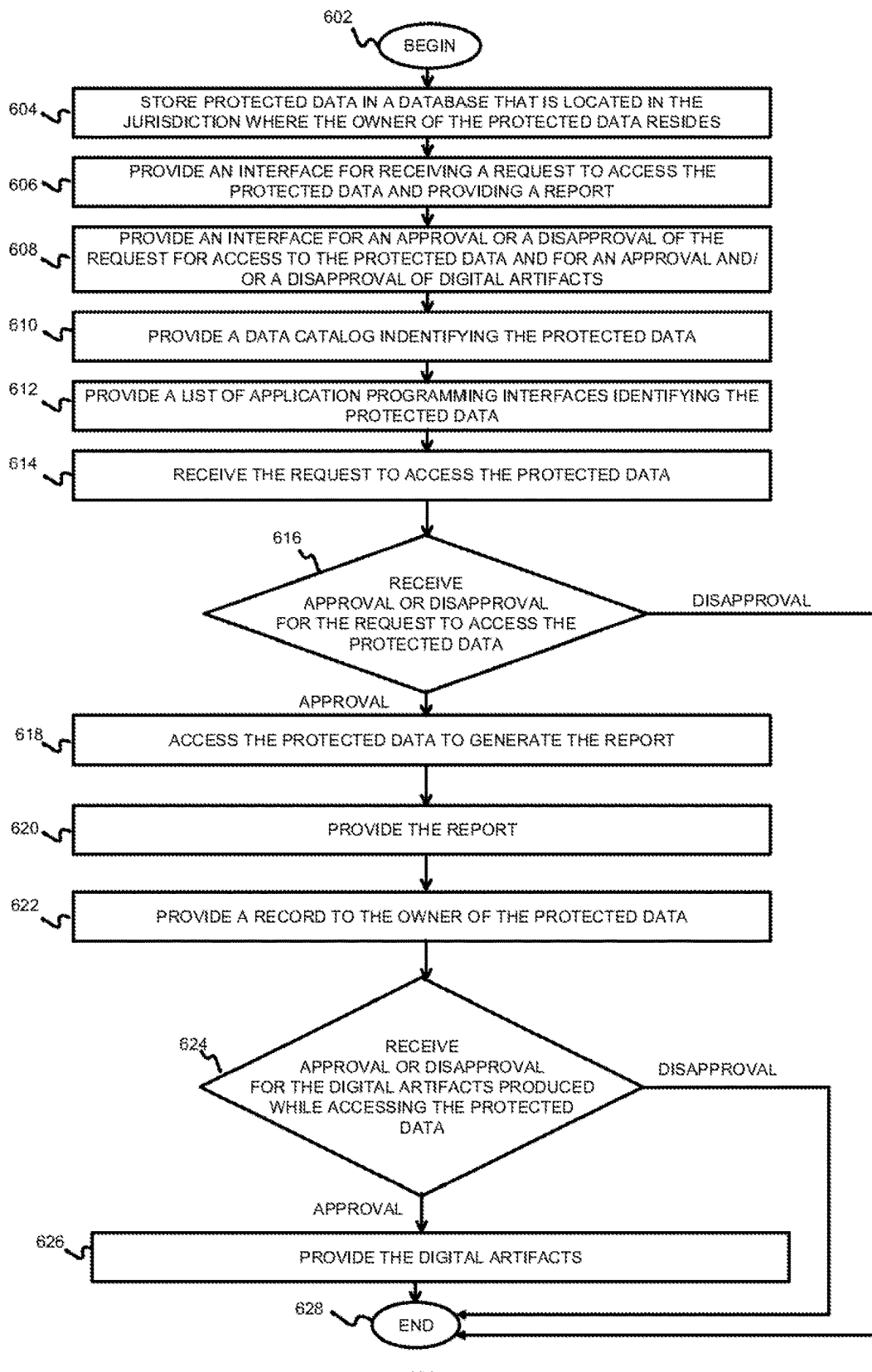
FIG. 6 is a flow chart for a method for data protection, according to an example embodiment of the disclosure.

FIG. 6 is a flow chart for a method 600 for data protection, according to an example embodiment of the disclosure. Method 600 begins at block 602. At block 604, protected data can be stored in a database and the database can be located in a jurisdiction where an owner of the protected data resides. At block 606, an interface can be provided for receiving a request to access the protected data and providing a report. At block 608, an interface can be provided for an approval or a disapproval of the request for access to the protected data and/or for an approval or a disapproval of digital artifacts. At block 610, a data catalog can be provided that identifies the protected data. At block 612, a list of APIs can be provided that identify the protected data. At block 614, a request to access the protected data can be received. At block 616, approval or disapproval for the request to access the protected data can be received. If disapproval is received, method 600 ends at block 628. If approval is received, at block 618, the protected data can be accessed to generate a report. At block 620, the report can be provided. At block 622, a record can be provided to the owner of the protected data. At block 624, approval or disapproval for the digital artifacts produced while accessing the protected data can be received. If disapproval is received, method 600 ends at block 628. If approval is received, at block 626, the digital artifacts can be provided. Method 600 ends at block 628.

For example, method 600 can be used to set up and maintain a system to provide a data escrow service that stores protected data in a database in a secure development environment. The system can be a cloud-based system. If the owner of the protected data resides in a particular jurisdiction, such as Germany, the database can be located in Germany, and an approver can be located in Germany, complying with data privacy, export, and/or business rules. The data escrow service can receive an application from a developer, run the application in the secure development environment, and provide a report to the developer that includes output, errors, digital artifacts, and/or debugging information. Digital artifacts can be any data that is created or modified when running developer applications. The developer can receive a data catalog, list of APIs, or other information from the data escrow service and use it to identify what access requests may need to be approved, before the data escrow service can run the application. The data escrow service can process requests to access data, run applications, provide results or provide reports and modify or further identify protected data that may need approval. The data escrow service can interact with the database and a data privacy regulator to create and maintain various information for developers about the protected data in the database. For example, some protected data can expire after a period of time and no longer be available. Other protected data can be restricted so that it can only be used for certain purposes.

Figure 7:
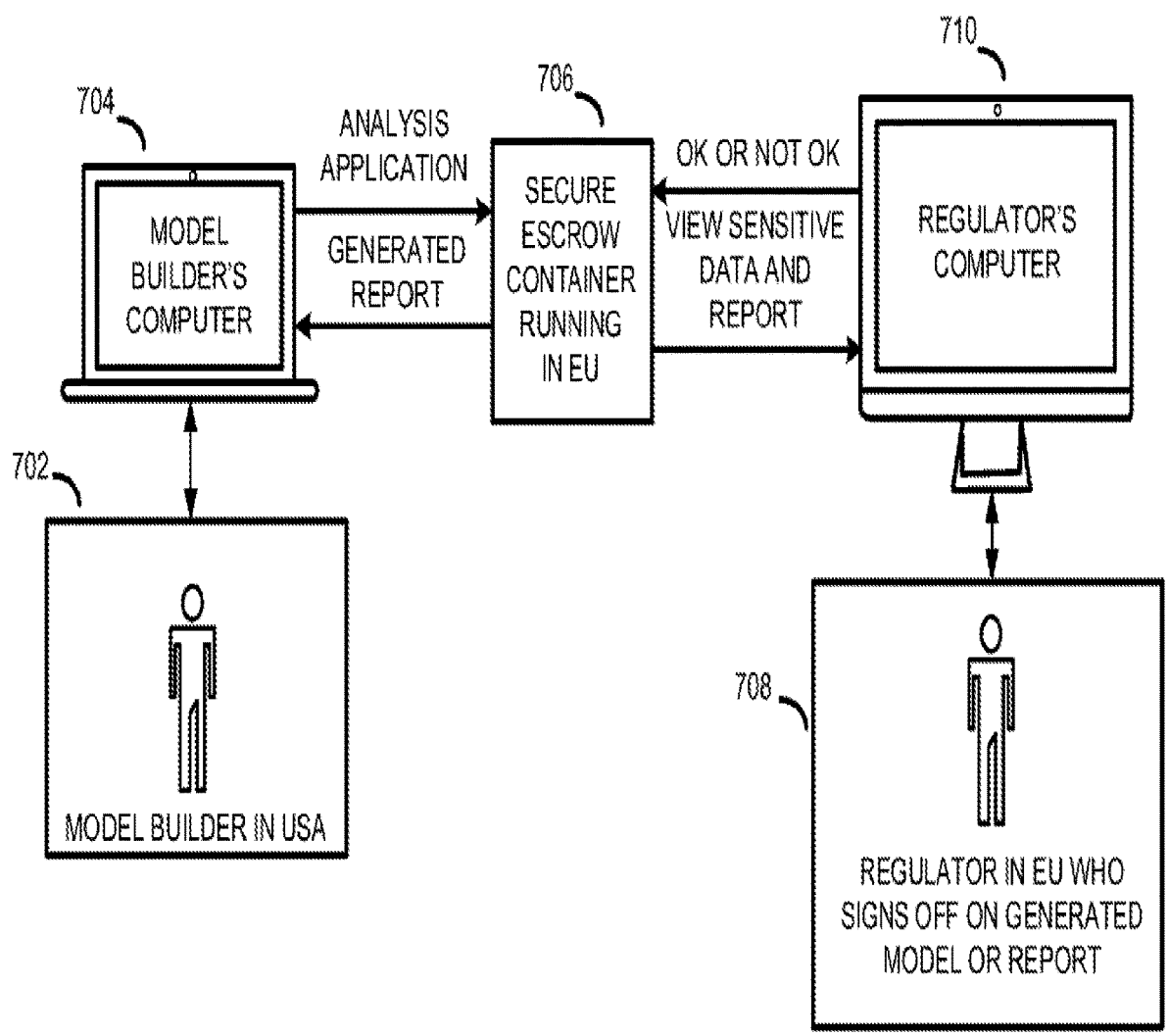
FIG. 7 is diagram of a container escrow system, according to an example embodiment of the disclosure.

FIG. 7 is diagram of a container escrow system 700, according to an example embodiment of the disclosure. Container escrow system 700 provides a trusted third party escrow service so that a software developer can submit software to run on data that is owned by others in a secure environment that protects data privacy. In container escrow system 700, a model builder 702 located in the USA can work at a model builder's computer 704 and submit an analysis application to a secure escrow container 706 that is running in the European Union (EU). The secure escrow container 706 runs the analysis application and generates a report for the model builder 702. A regulator 708 in the EU who signs off on generated models or reports works at a regulator's computer 710. The secure escrow container 706 interacts with the regulator's computer 710 to view sensitive data and the report and receive approval or disapproval from the regulator.

Model builder's computer 704 and regulator's computer 710 can be network-enabled computers. Secure escrow container 706 can include network-enabled computers and can include a data center in an EU country such as Germany.

Model builder 702 can run model building software in secure escrow container 706 using sensitive data such as customer information including name, street address, credit card, social security number, mother's maiden name, etc. For example, a generative adversarial network model can synthesize and analyze data by clustering customers into profiles or creating classes of customers based on locality from the street address, while no sensitive information can leave the secure escrow container, only the approved resulting model based on the analysis of the sensitive data and desensitized or scrubbed results can be exported from secure escrow container 706.

Model builder 702 need not filter data and can build models using both protected and unprotected data, relying on the secure escrow container 706 to interact with the regulator 708 to comply with data privacy rules. Model builder 702 can build models using protected data that otherwise may not be available or may be costly or difficult to obtain. Model builder 702 can run model building software in secure escrow container 706 on customer data for a company, without having to navigate internal company silos or departments that may make it difficult to share customer data.

Secure escrow container 706 can create a secure development environment using a containerization system architecture. Secure escrow container 706 can provide standard APIs or other access to data. Secure escrow container 706 can include a logging mechanism. Secure escrow container 706 can store digital products or artifacts that are produced while running the model in an intermediary storage space. The intermediary storage space can be stored separately from the protected data. If the model builder 702 wants to remove the digital products or artifacts from secure escrow container 706, then the regulator 708 can approve the digital products or artifacts with sanitization, if needed. Secure escrow container 706 can interact with regulator 708 to approve sanitized digital products or artifacts. Secure escrow container 706 can provide tools for model builder 702 to flag which data or features used by the model are likely to be protected. Digital products or artifacts can include models or reports.

Secure escrow container 706 can be a cloud-based environment enhanced with access controls to protect data privacy. Secure escrow container 706 can be a platform for software development with a user-facing component such as a web application outside of secure escrow container 706 and accessible from model builder's computer 704 and regulator's computer 710. For example, model builder 702 can logon to the web application and find data catalogs of available data, schemas, descriptions of features in datasets, and so on. Model builder 702 can determine what data they would like to use, which data is protected, formats of data, and documentation on APIs available for use by modeling code inside secure escrow container 706. Model builder 702 can upload code to use in the modeling code such as Python or Java, JAR (Java archive) files.

After model builder 702 uses the public-facing web application to find data, formats, APIs, and the like to develop software models and programs, then, model builder 702 can run the software in secure escrow container 706 against internal data sources. If there are any execution errors, secure escrow container 706 can screen out any sensitive information and provide sanitized reports, error logs, and other results to model builder 702. For example, an error log can reveal that model builder used four arguments instead of three in an API call. If the code runs without errors, it can create output or digital artifacts such as a trained model.

Secure escrow container 706 can include a work queue for jobs submitted. Secure escrow container 706 can request regulator 708 to view the data accessed and output by a job and sign off on it. Either regulator 708 can approve the job and secure escrow container 706 can provide the job report to model builder 702 or secure escrow container 706 can sanitize the disapproved job report and then provide the sanitized job report to model builder 702 using the web application. Secure escrow container 706 can receive web application submissions and manage the workflow of jobs.

Figure 8:
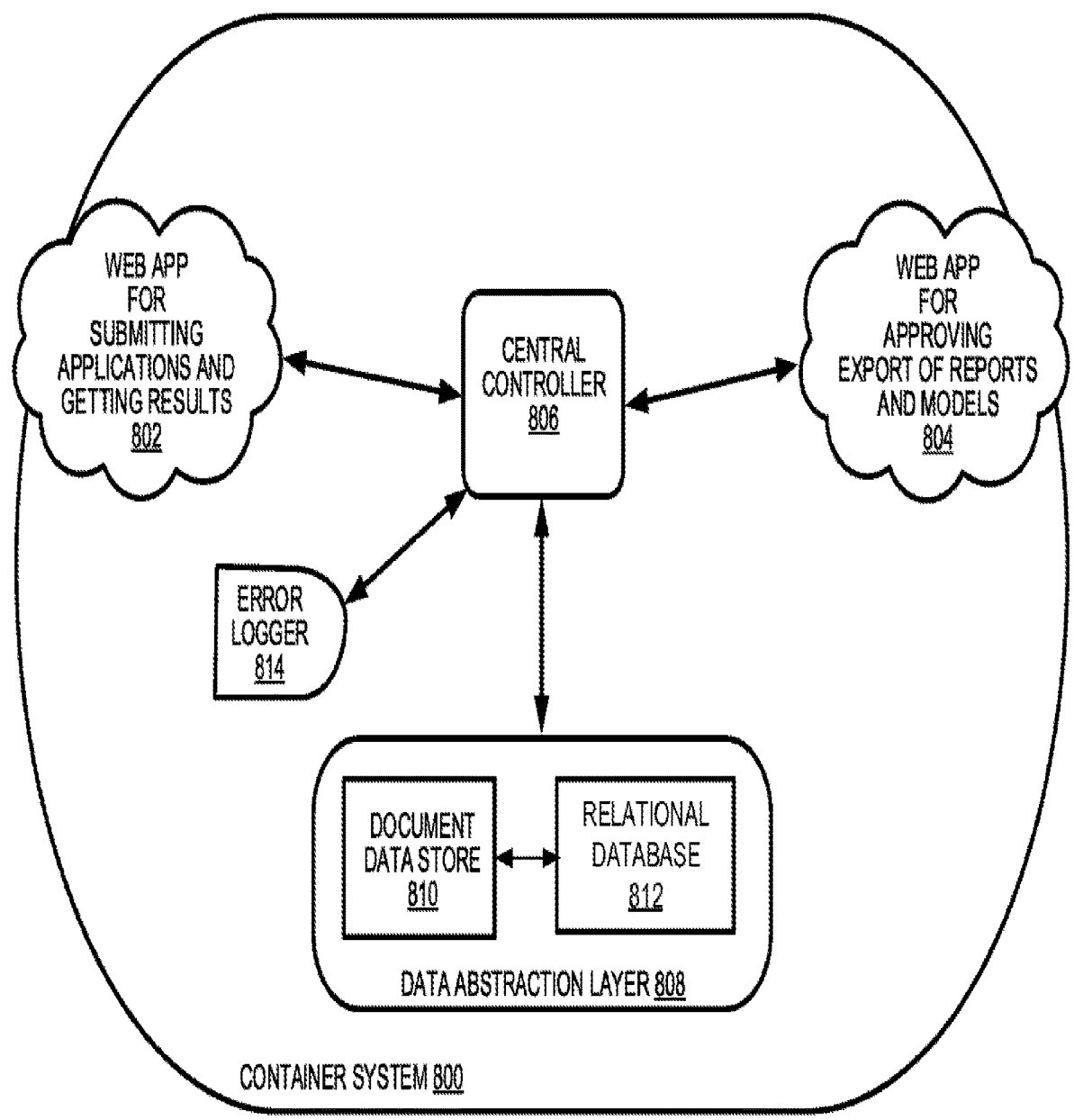
FIG. 8 is diagram of a container system, according to an example embodiment of the disclosure.

FIG. 8 is diagram of a container system 800, according to an example embodiment of the disclosure. Container system 800 includes a web app for submitting applications and getting results 802, a web app for approving export of reports and models 804, a central controller 806, a data abstraction layer 808, and an error logger 814. Data abstraction layer 808 includes a document data store 810 and a relational database 812. Central controller 806, error logger 814, and data abstraction layer 808 can be network-enabled computers in data communications. Web app for submitting applications and getting results 802 and web app for approving export of reports and models 804 can be applications and APIs provided by central controller 806 to network-enabled computers that are outside of and interface with container system 800.

Container system 800 can be a secure computing environment providing an escrow service to protect data privacy for developers, data owners, and regulators. Developers can use web app for submitting applications and getting results 802 to access data that is protected inside container system 800. Data owners can use web app for approving export of reports and models 804 to import sensitive data assets as well as export data. Regulators can use web app for approving export of reports and models 804 to ensure compliance with data privacy rules. Central controller can receive approval or disapproval from regulators when processing applications and their results.

Container system 800 can be located in a country where a data owner is a citizen and where that country's regulator resides. Container system 800 can be located inside a company that processes protected data such as customer health or financial data. Container system 800 can be a cloud-based system.

Data abstraction layer 808 can store data in document data store 810 and relational database 812. Document data store 810 can store items such as documents, files, and spreadsheets. Relational database 812 can store items such as records, tables, data sets, schemas, APIs, data catalogs and lists of protected data and features. Data abstraction layer 808 can store temporary files from running applications such as output, models, reports and digital artifacts. Data abstraction layer 808 can store, modify, delete, and access data from developers, regulators, and data owners. Data abstraction layer 808 can provide APIs for developers, regulators, and data owners on web applications outside container system 800. Central controller 806 can mediate APIs for developers, regulators, and data owners inside container system 800. Data abstraction layer 808 can receive requests to access the protected data. For example, the developer can request access to protected patient x-ray records. Relational database 812 can include various APIs available to developers. Relational database 812 can interact with central controller 806 and document data store 810 to process the requests from developers to access protected data.

Central controller 806 can include a work queue that manages submitted applications and data approval. Central controller 806 can run applications from developers, access data while processing applications, and request approval of output, reports, models, and digital artifacts from regulators. Central controller 806 can log errors while processing applications using error logger 814 and provide error logs with sanitized information, if needed, to developers. Central controller 806 can store data related to the work queue, such as who submitted a run, who owns what data, who had access to what data, what report or results were generated, what data is protected, what resources were used in a run, which regulator approved what, job status, and the like.

Error logger 814 can receive a digital artifact and provide a privacy record. The digital artifact can be any kind of data generated in container system 800 such as data related to protected data or program results. For example, a developer application run on protected data may modify the protected data or generate new data that is related to the protected data. The privacy record for the digital artifact can be created or updated to comply with data privacy concerns.

Container system 800 can be used in large companies to facilitate data sharing among internal organizations, while ensuring data privacy compliance. Container system 800 can be used in jurisdictions where data needs to be kept in the same country where the data owners and regulators live.

Figure 9:
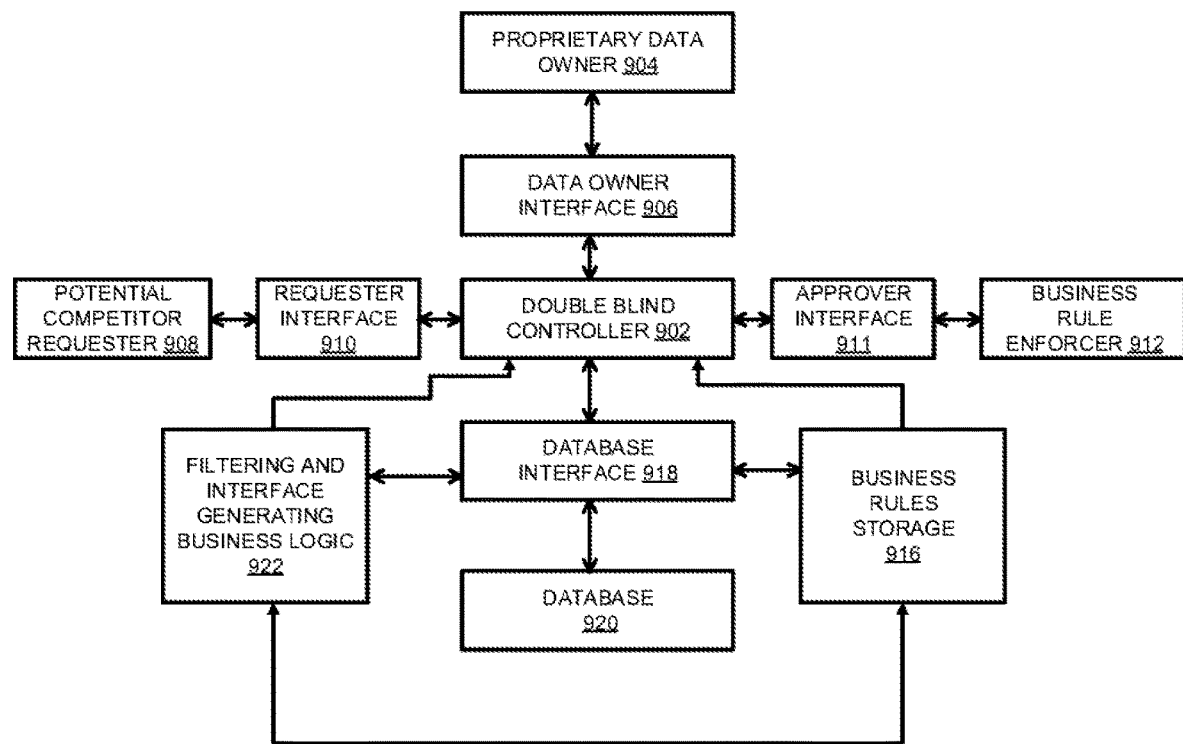
FIG. 9 is diagram of a double blind system, according to an example embodiment of the disclosure.

FIG. 9 is diagram of a double blind system 900, according to an example embodiment of the disclosure. Double blind system 900 can include a double blind controller 902, a proprietary data owner 904, a potential competitor requester 908, a business rule enforcer 912, and a database 920. Double blind controller 902 can interact with proprietary data owner 904 using a data owner interface 906, interact with potential competitor requester 908 using a requester interface 910, interact with business rule enforcer 912 using an approver interface 911, and interact with database 920 using a database interface 918. Double blind system 900 can include filtering and interface generating business logic 922 and business rules storage 915.

Double blind system 900 can be used to manage interactions between proprietary data owner 904 and potential competitor requester 908, according to business rules. The business rules facilitate sharing protected data between the parties by hiding certain information about the interactions from one or both parties. For example, Bank ABC has proprietary transaction data for merchants and customers and Merchant XYZ wants to be able to run a query on that proprietary data to, for example, build a sales model. Bank ABC doesn't want to give Merchant XYZ unfettered access to the proprietary data and Merchant XYZ doesn't want Bank ABC to know exactly what it's searching for because they compete in some regards. Double blind system 900 can act as an intermediary between Bank ABC and Merchant XYZ to protect the interests of both parties according to business rules that the parties can agree on. Double blind controller 902 can use interfaces and business rules to protect the interests of both parties. Interfaces can be used to define common roles and scenarios and business rules can be used to enforce the terms of the agreement between the parties. Double blind controller 902 can use the interface and business rules to make sure that commercially sensitive information and proprietary data from Bank ABC and stored in database 920 is not revealed to Merchant XYZ and to make sure that Bank ABC doesn't find out what information Merchant XYZ is requesting or how it is using the information. Interfaces can be limited in scope and purpose so that sensitive information is concealed, honoring the interests of both parties.

For example, double blind controller 902 can enforce compliance with import/export laws in cross-border commerce between parties. Any data stored in database 920 that cannot be imported or exported can be stored and accessed in double blind system 900 with business rules and interfaces that comply with applicable laws for interactions between international commercial parties. The sensitive data can be safely contained in database 920 of double blind system 900 and double blind controller 902 can securely control what information is imported into or exported from double blind system 900 using interfaces and business rules. Suppose Heinz lives in Germany for 20 years and has a great credit rating and then moves to the United States for a new job. Heinz needs to get a credit card in the United States and Bank ABC cannot access his German credit rating because of data export prohibitions. Double blind system 900 can facilitate a query by Bank ABC as potential competitor requester 908 using the requester interface 910 to query database 920, which holds his German credit rating information and is located in Germany. The business rules can embody the rules about German credit rating information and jurisdictional limitations, which were agreed upon before the data was provided to double blind system 900 by proprietary data owner 904 such as a German banking affiliate of Bank ABC. Bank ABC can receive results in the form of a credit rating or get a loan approval or a credit threshold approval for Heinz without exposing the underlying sensitive information.

Double blind controller 902 can be a neutral third party who provides a service to the various stakeholders of double blind system 900. Double blind controller 902 can act as a mediator between stakeholders, comparing requests with business rules and processing the requests and accessing the data in database 920 with approval from business rule enforcer 912 and using filtering and interface generating business logic 922 in a way that balances the interests between the stakeholders.

Double blind system 900 can be used with business rules that protect privacy and personally identifiable information (PII) for healthcare industry stakeholders, such as patients, medical researchers, universities, hospitals, healthcare providers, insurance companies, etc. Business rules can be agreed to by the stakeholders before storing the protected data in database 920 and access can be approved by business rule enforcer 912. Custom interfaces can be setup and maintained by double blind controller 902 to manage changing business rules and business relationships and agreements among stakeholders. For example, pools of research data can be shared for medical research into life-saving drugs and cures without compromising sensitive, private, healthcare-related information of patients and other participants.

In this description, numerous specific details have been set forth. It is to be understood, however, that implementations of the disclosed technology can be practiced without these specific details. In other instances, well-known methods, structures and techniques have not been shown in detail in order not to obscure an understanding of this description.

References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it could.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A data control system, comprising:
 a database storing protected data; and
 a central controller in data communication with the database, the central controller comprising a processor and a memory,
 wherein, upon receipt from a requester of a data access request to access the protected data from the requester, the central controller is configured to:
  request approval or disapproval of the data access request,
  upon receipt of an approval of the data access request, the central controller is configured to:
   request permission to provide protected data,
   upon receipt of an approval of permission to provide protected data, the central controller is configured to:
    retrieve the protected data from the database based on the data access request, and
    transmit the protected data to the requester, and upon receipt of a disapproval of permission to provide protected data, the central controller is configured to:
retrieve the protected data from the database based on the data access request,
generate sanitized results by removing at least a portion of the protected data, and
transmit the sanitized results to the requester.

2. The data control system of claim 1, wherein the central controller is configured to generate sanitized results by applying one or more filters to the protected data.

3. The data control system of claim 1, wherein the central controller removes at least a portion of the protected data by performing a cryptographic erasure.

4. The data control system of claim 1, wherein the central controller removes at least a portion of the protected data by performing a data purge.

5. The data control system of claim 1, wherein the central controller is configured to utilize a data sanitization application programming interface (API) to generate the sanitized results.

6. The data control system of claim 5, wherein the data sanitization API is provided by a regulatory entity.

7. The data control system of claim 6, wherein the central controller is configured to generate a data sanitization report for the sanitized results for audit by the regulatory entity.

8. The data control system of claim 7, wherein the data sanitization report is a life cycle record for the protected data.

9. The data control system of claim 8, wherein the life cycle record includes a usage log for the protected data.

10. The data control system of claim 1, wherein the central controller is configured to generate a certificate of erasure for the protected data.

11. The data control system of claim 10, wherein the certificate of erasure is tamper-proof and digitally signed by the central controller.

12. A data control method performed by a computer arrangement comprising a processor and a memory, the method comprising:
receiving from a requester a data access request to access protected data from the requester;
requesting approval or disapproval of the data access request;
upon receipt of an approval of the data access request, transmitting the protected data to the requester; and
upon receipt of a disapproval of the data access request:
requesting permission to provide the protected data,
upon receipt of an approval of permission to provide protected data:
retrieving the protected data based on the data access request, and
transmitting the protected data to the requester, and
upon receipt of a disapproval of permission to provide protected data:
retrieving the protected data based on the data access request,
generating sanitized results by removing at least a portion of the protected data, and
transmitting the sanitized results to the requester.

13. The data control method of claim 12, further comprising:
prior to requesting approval or disapproval of the data access request, modifying the data access request according to one or more data usage rules.

14. The data control method of claim 13, wherein the one or more data usage rules translate a first data format into a second data format.

15. The data control method of claim 13, wherein the one or more data usage rules restrict the sanitized results to use for a single purpose.

16. The data control method of claim 13, wherein the one or more data usage rules are data privacy rules.

17. The data control method of claim 13, wherein the one or more data usage rules are business rules.

18. The data control method of claim 13, wherein the one or more data usage rules are export rules.

19. The data control method of claim 13, wherein:
the protected data is stored in a database located in a first jurisdiction, and
the one or more data usage rules comply with regulations applicable within the first jurisdiction.

20. A non-transitory computer-accessible medium having stored thereon computer-executable instructions, wherein upon execution by a computer arrangement comprising a processor, the instructions cause the computer arrangement to perform procedures, comprising:
receiving from a requester a data access request to access protected data from the requester;
requesting approval or disapproval of the data access request;
upon receipt of an approval of the data access request:
retrieving the protected data based on the data access request, and
transmitting the protected data to the requester; and
upon receipt of a disapproval of the data access request:
requesting permission to provide the protected data,
upon receipt of an approval of permission to provide protected data:
retrieving the protected data based on the data access request, and
transmitting the protected data to the requester, and
upon receipt of a disapproval of permission to provide protected data:
retrieving the protected data from the database based on the data access request,
generating sanitized results by removing at least a portion of the protected data, and
transmitting the sanitized results to the requester.

* * * * *